United States Patent

Rimpi

[11] Patent Number: 4,470,957
[45] Date of Patent: Sep. 11, 1984

[54] METHOD FOR RECOVERING SODIUM CHEMICALS FROM GREEN LIQUOR AND FLUE GASES

[75] Inventor: Pertti Rimpi, Tampere, Finland
[73] Assignee: Oy Tampella Ab, Tempere, Finland
[21] Appl. No.: 410,449
[22] Filed: Aug. 23, 1982
[30] Foreign Application Priority Data
   Sep. 8, 1981 [FI] Finland ............................ 812776
[51] Int. Cl.³ ............................................ B01D 53/54
[52] U.S. Cl. .............................. 423/179; 423/DIG. 3
[58] Field of Search ............... 423/200, DIG. 3, 179
[56] References Cited
   U.S. PATENT DOCUMENTS
   3,826,710  7/1974  Anderson .................. 423/DIG. 3
   4,187,279  2/1980  Rimpi ............................... 422/173

Primary Examiner—John Doll
Assistant Examiner—Wayne A. Langel
Attorney, Agent, or Firm—Brooks, Haidt, Haffner & Delahunty

[57] ABSTRACT

The invention relates to a method for recovering sodium chemicals from green liquor by precarbonating green liquor by means of flue gases, by bringing a pre-carbonated solution into contact with a sodium bicarbonate solution and by stripping hydrogen sulphide from the so obtained reaction mixture by means of steam, for producing hydrogen sulphide gas and a sodium carbonate solution, which sodium carbonate solution is so pure, in relation to sodium sulphide that it can directly be led into the washing of the flue gases and into a carbonation stage, for producing the sodium bicarbonate solution.

In order to save steam and sodium carbonate all precarbonated solution is not treated to the sodium sulphide free solution, which is required by a scrubber, but a part is discharged at higher sodium sulphide content by dividing the stripping into two stages which take place one above the other in the same tower, whereby a part of a solution obtained from the first stripping stage is led directly into the second stripping stage and the steams containing hydrogen sulphide, obtained from the second stripping stage are led directly into the first stripping stage.

9 Claims, 1 Drawing Figure

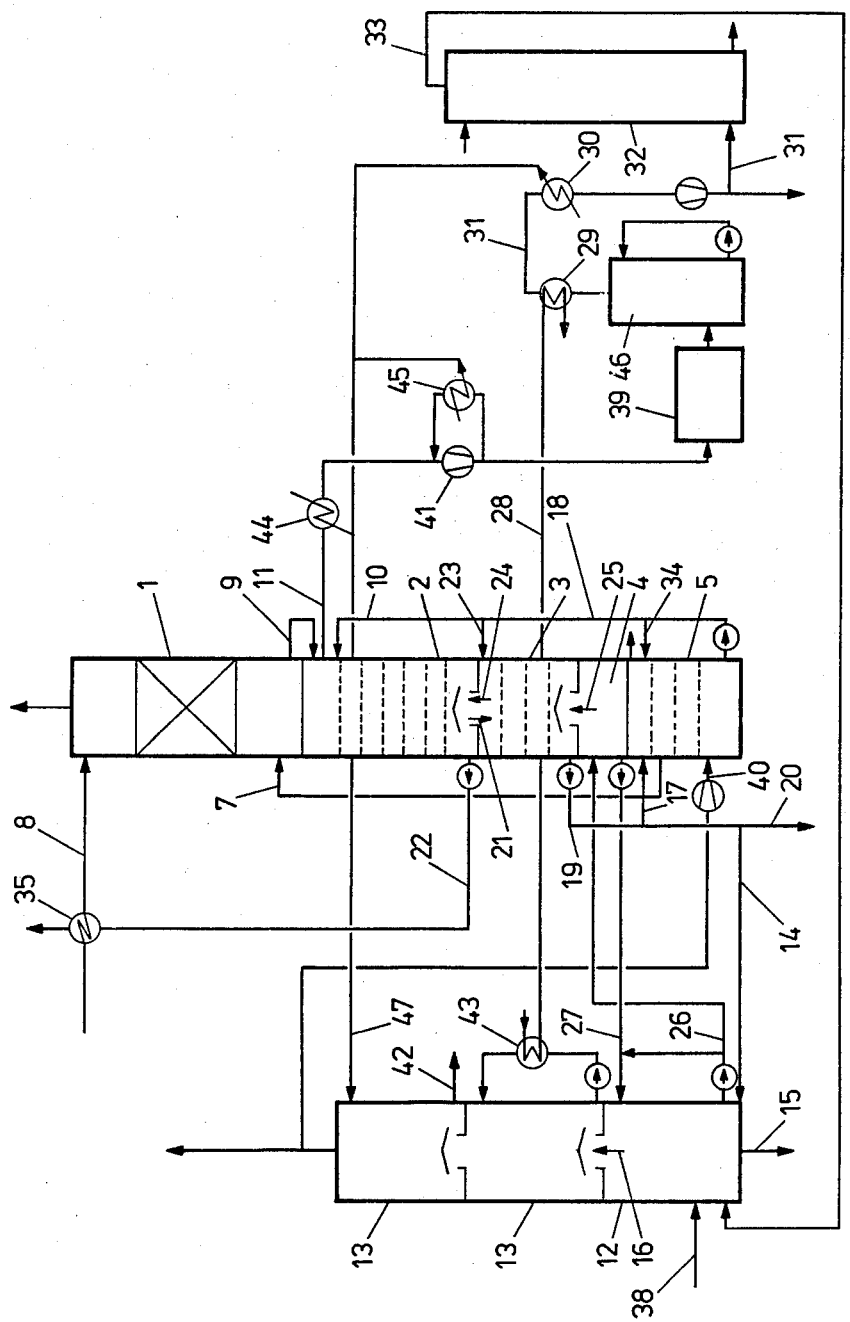

METHOD FOR RECOVERING SODIUM CHEMICALS FROM GREEN LIQUOR AND FLUE GASES

BACKGROUND OF THE INVENTION

This invention relates to a method for recovering chemicals from flue gases obtained from burning in pulp mills which use sodium as cooking base and from a water solution of the smelt i.e. green liquor. Waste liquor containing remarkable amounts of sodium chemicals, the recovery of which is economically profitable, is obtained as a waste from the pulping performed by sodium based sulphite cooking liquor. For the recovery of chemicals, waste liquor has been concentrated by evaporating and burning it in the recovery boiler whereby flue gases containing sulphur and carbon dioxides are obtained, and a smelt, from which so-called green liquor containing sodium sulphide has been obtained by dissolving it into water. Sulphur dioxide is washed from the flue gases by a sodium carbonate solution made from green liquor. Sodium sulphite formed then is used as such in the sodium suphite pulping.

The before-mentioned sodium carbonate solution is produced from green liquor by precarbonating green liquor first by means of the washed and cooled flue gases whereby sodium sulphide reacts with the carbon dioxide of the flue gases and sodium bisulphide is obtained.

The precarbonated sodium bisulphide solution is thereafter brought to react with the sodium bicarbonate solution produced in the process, whereby sodium carbonate and hydrogen sulphide are obtained. Hydrogen sulphide has been stripped by steam and burnt in a sulphur burner into sulphur dioxide which has been led together with other flue gases into the washer for production of sodium sulphite.

By leading the precarbonated sodium bisulphide solution according to the Finnish patent specification 54946 in the stripping stage into contact with the solution which contains at least a double amount of sodium bicarbonate compared to the equivalent amount of sodium bisulphide, essentially all sodium bisulphide can have been converted into sodium carbonate and hydrogen sulphide. Then essentially all washed and cooled flue gases, except those ones used for the precarbonation, have been led into the carbonation stage, into which a part of the stripped solution containing sodium carbonate has been brought back for raising its sodium bicarbonate concentration. Because the solution leaving the stripping stage does not contain any sodium bisulphide, it can be fed into the washer directly without any extra crystallizations. Before the process according to the Finnish patent specification 54946 the stripped sodium carbonate could not namely be led directly into the washer of the flue gases because this solution still contained some sodium bisulphide. Therefore the stripped solution had first been taken into a crystallizer in which sodium carbonate and sodium bicarbonate have been crystallized from the solution. These crystals have then again been dissolved in water and part of the solution thus obtained has been led into the flue gas washer in which the sulphur dioxide of the flue gases reacts with sodium carbonate for production of sodium sulphite. The rest of the solution has been led into a carbonation reactor in which the sodium carbonate of the solution has been allowed to react with the washed flue gases to increase the sodium bicarbonate content of the solution so much that this solution could be taken into the stripping stage.

The sodium carbonate solution free enough from sodium bisulphide needed for the flue gas washer can then be produced in two different ways, either in a way according to the Finnish patent specification 54946 by using in the stripping stage at least a double excess amount of sodium bicarbonate compared to a sodium bisulphide equivalent amount or by crystallizing sodium carbonate and bicarbonate crystals from the solution obtained in the stripping stage, by separating the crystals and by dissolving these again and by feeding the solution obtained into the washer.

A method based on the crystallization and the separation of crystals is relatively cumbersome, in addition to which the devices needed are very expensive. The advantage of this method is again the fact that only so big a part of the solution from the stripping stage needs to be crystallized as the sodium carbonate solution is needed for the washer. In this way just that needed amount of the sodium carbonate solution with the lowest possible residual sulphide content, can be produced while the rest of the solution with the higher sulphide content is used for purposes which are not impeded by the higher sulphide content.

The advantage of the method according to the Finnish Pat. No. 54946 is that so pure a sodium carbonate solution regarding sodium bisulphide is obtained directly from the stripping stage that it can be led into the flue gas washer without any extra crystallizations. This makes it possible to use simplier devices, whose space requirements are lesser and investment costs lower. The disadvantage of this method is that the flue gas washer cannot receive all sodium carbonate leaving the stripping stage so that part of it has to be used elsewhere and in such objects which do not provide so pure a solution regarding sodium bisulphide. Thus too much steam or heat and bicarbonate have to be used in this method.

The object of the present invention is thus to provide a method for recovering sodium chemicals from the flue gases and green liquor obtained from burning in the pulp mills so that sodium carbonate and sodium bicarbonate need not to be crystallized from the solution obtained in the stripping stage, these crystals need not to be separated and dissolved again for feeding into the flue gas washer and however, so that just as much sodium carbonate solution, which is pure enough regarding sodium sulphide, is obtained from the stripping stage as is necessary in the flue gas washer whereby the rest of the solution can be used elsewhere, for processes in which the higher sodium bisulphide content in the sodium carbonate solution can be allowed. The purpose of the invention is thus to accomplish a more economical and flexible method for converting sodium sulphide and/or sodium bisulphide into other products using less steam or heat and without need to feed as much sodium bicarbonate solution as in the prior art into the stripping stage.

SUMMARY OF THE INVENTION

According to the present invention the separation of hydrogen sulphide is performed at least in two stages so that a sodium carbonate solution containing more sodium bisulphide or sodium sulphide is obtained from the first stage and a sodium carbonate solution so free from sodium bisulphide and sodium sulphide from the second stage that it can be fed directly into the flue gas washing. By means of the present invention it is thus possible to produce exactly the desired amount of such sodium carbonate solution, the sodium sulphide or sodium bisulphide content of which is low enough for the use purpose of the solution. By performing the separation of hydrogen sulphide in more than two stages, several sodium carbonate fractions varying in their sodium sulphide content can be produced and the need of heat and/or steam in the process can thus be minimized and at the same time they can be produced by the smallest possible sodium bicarbonate solution amounts to be fed into the stripping stages.

By means of the present invention it is also possible to diminish the size of the separation devices of hydrogen sulphide when less sodium bicarbonate solution than before is needed for the production of the same sodium carbonate solution amount. The separation stages are combined advantageously on top of each other so that a carrier gas or steam streams from below upwards through the separating bottoms while the sodium bicarbonate solution is fed separately into each stage and sodium carbonate streams varying in their amount and sodium sulphide content are removed.

The heat economy of the present invention is made very advantageous by using steam, which is obtained by means of expansion evaporation from the solution of the flue gas washing, for separation of hydrogen sulphide from the precarbonated sodium bisulphide solution. The expansion streams are then led advantageously into the second separation stage and therefrom further through the bottom, which separates the stages, into the first separation stage. The operating pressure for the separation stages of hydrogen sulphide is then regulated so that the temperature at the expansion evaporation stage is lower than a dewpoint of the flue gas to be washed, advantageously 5°–40° C. lower than a dewpoint of the flue gas to be washed. The operating temperature of the expansion evaporation stage is thus advantageously below 70° C.

The heat economy of a method according to the present invention can further be improved by recovering heat from hydrogen sulphide gas removed in its separation stage and from sulphur dioxide gas obtained from its burning and by using this heat for raising the temperature of raw water obtained when cooling flue gases.

In order that at least the sodium carbonate solution which leaves the second separation stage of hydrogen sulphide will be pure enough in relation to sodium bisulphide or sodium sulphide, so much washed and cooled flue gases are fed into the carbonation stage that part of the sodium carbonate containing solution or slurry to be fed from the carbonation stage into the second separation stage contains at least a double amount of sodium bicarbonate, compared to the sodium bisulphide content, which leaves the first separation stage. The washed and cooled flue gases used in this process are in totality fed first into the carbonation stage and part of these gases are fed from the carbonation stage further into the precarbonation stage.

DESCRIPTION OF THE DRAWING

The accompanying drawing illustrates a schematic vertical section view of a device for applying the method according to the invention, in which device all units used for the carbonation, expansion evaporation, stripping stage and precarbonation are in the same column one on top of another.

DESCRIPTION OF THE PREFERRED EMBODIMENT

When thick liquor is burnt in the recovery boiler a smelt is obtained which is dissolved in water into green liquor. Dry solids are separated from the green liquor by clarifying. Clarified green liquor 8 is pumped into the uppermost part 1 of the column where it is treated with the flue gases 7 according to the principle of countercurrent flow. The precarbonation stage 1 can be realized either according to the spraying—, packing piece—or tray reactor principle. The sodium sulphide of the green liquor reacts with the carbon dioxide of the flue gases ahd is partly or completely precarbonated into sodium hydrogen sulphide. The flue gas of the precarbonation stage leaves the column from the upper end.

The precarbonated solution 9 is thereafter led into the next unit 2 of the column where it is treated with a sodium bicarbonate solution 10 whereby sodium bisulphide reacts with sodium bicarbonate into sodium carbonate and hydrogen sulphide. The hydrogen sulphide is transferred by means of steam 24 fed in from the lowermost part of the stripping stage 2 from the liquid phase to the gas phase and is removed from this first stripping stage 2 along a tubing 11. The liquid 22 flowing out from the first separation stage 2 contains mainly sodium carbonate and sodium bicarbonate and a minor amount of non-reacted sodium bisulphide from the first precarbination stage 1. A green liquor solution 8 to be fed into the precarbination stage is cooled by this solution 22 in a heat exchanger 35. This solution 22 can be used in such places which tolerate higher content of residual sulphide than a flue gas washer 12.

That part of the solution containing sodium which is needed for the production of a sodium carbonate and sodium bicarbonate solution 19 with a low sulphide content is led as flow 21 through the bottom of the first stripping stage 2 into the second stripping stage 3 of hydrogen sulphide where it is further treated by the sodium bicarbonate solution 23 and the liberated hydrogen sulphide is transferred from the liquid phase into the gas phase by means of the steam 25 fed through the bottom of the second stripping stage 3 and the so produced steam containing hydrogen sulphide is further transferred through the bottom, which separates the first and the second stripping stages 2 and 3, from the second into the first stripping stage 2.

The sodium carbonate and sodium bicarbonate containing solution 19 obtained from this second stripping stage 3 contains so minor an amount of residual sodium sulphide that one part of the flow can be led directly into the flue gas washer 12, another part of the solution 19 is led into a carbonation stage 5, and the rest is removed from the process along a tubing 20 for the utilization in other purposes. In the flue gas washer 12 flue gases 38 containing carbon and sulphur dioxides are washed with the sodium carbonate solution 14, which is obtained from the above-mentioned second stripping stage and contains very little residual sodium sulphide for the production of a sodium sulphite solution 15 to be removed from the washer 12.

A part 26 from a circulation solution of the washer 12 is led into an expansion evaporation chamber 4 between the carbonation stage 5 and the second stripping stage 3 where a part of the solution is evaporated into the steam 25 to be fed into the second stripping stage 3. The cooled solution 27 is returned from the expansion evaporation chamber 4 into the washer 12. The flue gas 16 from the washer 12 is led thereafter into two superposed and successive cooling stages 13 where the washed flue gases 16 are cooled by water and wherefrom raw water, which has got warm in the cooling, is removed along a tubing 42. The washed and cooled flue gases are removed from the upper part of a washing and a cooling tower 12, 13 and a part of these gases are led along the tubing 40 into the carbonation stage 5 where the sodium carbonate solution 17 obtained from the second stripping stage 3 is handled by the flue gases for converting sodium carbonate by means of carbon dioxide into sodium bicarbonate. The bicarbonate solution 18 obtained is removed from the carbonation stage 5, part of it is returned back into the carbonation stage along a return pipe 34 and the rest is led into the first stripping stage 2 along a pipe 10, and into the second stripping stage 3 along a pipe 23. So much sodium bicarbonate solution is led into the second stripping stage 3 along the pipe 23 that the amount of sodium bicarbonate flowing in with this solution is at least double compared to an equivalent amount of sodium bisulphide flowing in with the solution 21 from the first stripping stage 2 into the second stripping stage 3. Hereby essentially all sodium bisulphide reacts in the second stripping stage 3 so that the sodium carbonate solution 19 which is essentially free from the sodium bisulphide is obtained for the washing 12 of the flue gases and for the production of the sodium bicarbonate solution 18 in the carbonation stage 5.

Hydrogen sulphide gas 11 obtained from the first stripping stage 2 is burnt 39 into sulphur dioxide gas, which is cooled 46 and that part of this sulphur dioxide gas, which is not used in other processes, is led along a pipe 31 into the production 32 of the sluphur dioxide water, the exhaust gases 33 of which are washed in the flue gas washer 12.

Hydrogen sulphide gas is pumped from the first stripping stage 2 into a burning device 39 with a pump 41 adapted to a pipeline 11, by means of which pump underpressure prevailing in both stripping stages 2 and 3 is also regulated. The operating pressure of the stripping stages 2 and 3 is hereby regulated by the pump 41 so that the temperature prevailing in the expansion evaporation chamber 4 is lower than the dewpoint of the flue gas to be washed.

The washing water fed into a cooling tower 13 of the flue gases is heated by hydrogen sulphide gases 11 in a surface condenser 44 and in a circulation heat exchanger 45 of a vacuum pump 41 and in a recooler 30 by sulpher dioxide gases 31 and the so obtained preheated raw water is led along a pipe 47 into the uppermost part of the cooling tower 13. Heat can also be recovered indirectly from a cooling water of the washing tower 13 in the heat exchanger 43 and from warm sulphur dioxide gases 31 in the heat exchanger 29 by pumping water 28 through these heat exchangers 43 and 29.

EXAMPLE

The recovery boiler discharges 157000 m$^3$ n/h dry flue gases which contain 12.97% carbon dioxide corresponding to 1.4 kmol/h and the dewpoint of the gas being 70.5° C.

The green liquor amount 18.3 m$^3$/h containing $Na_2CO_3$ 23.1 kmol/h and $Na_2S$ 12.4 kmol/h is taken into a process.

The precarbonation of the solution in a reaction 2 $Na_2S + H_2O + CO_2 = 2\ NaHS + Na_2CO_3$ takes carbon dioxide $0.5 \times 12.4$ kmol/h = 6.2 kmol/h.

The precarbonation takes 2080 m$^3$ n/h flue gases while the input content of carbon dioxide is 12.3% and the absorption degree of carbon dioxide is 54.5%.

For the separation of hydrogen sulphide in the stripping $NaHS + NaHCO_3 = Na_2CO_3 + H_2S$ sodium bicarbonate is needed, 24.8 kmol/h of which is brought into the first stripping stage and with it 4.1 kmol/h of carbonate.

10.2 kmol/h of hydrogen sulphide is separated from the sulphide of the coming solution in the first separation stage of hydrogen sulphide.

The separation of hydrogen sulphide takes bicarbonate, in addition to a main reaction of hydrogen sulphide, for a byreaction $2\ NaHCO_3 = Na_2CO_3 + CO_2 + H_2O$ corresponding in the first stripping stage to a 0.9 kmol/h bicarbonate amount.

Part of the solution containing sulphide is discharged from the first separation stage of hydrogen sulphide of the process containing 28 kmol $Na_2CO_3$/h, 8.6 kmol $NaHCO_3$/h and 1.4 kmol NaHS/h.

The remaining part of the solution with sulphide concentration, containing 16 kmol $Na_2CO_3$/h, 5.1 kmol $NaHCO_3$/h and 0.8 kmol NaHS/h, is transferred from the first separation stage of hydrogen sulphide into the second separation stage of hydrogen sulphide, into which 3.2 kmol bicarbonate/h and 0.5 kmol carbonate/h are added.

The second separation stage of hydrogen sulphide takes 1.5 kmol/h bicarbonate.

Hydrogen sulphide, which is separated in the second separation stage of hydrogen sulphide, is transferred into the first stripping stage wherefrom it is discharged with the H$_2$S gas separated in the first stripping stage, in totality 10.8 kmol/h H$_2$S, which is burnt after the condensation of water vapour into the SO$_2$ gas, which is cooled and of which gas a part is prepared into the SO$_2$ water, 3.8 kmol SO$_2$/h. Vent gases of the SO$_2$ water preparation containing 0.45 kmol SO$_2$/h are led into the gas washing where they are washed together with other flue gases to be washed, and alkali needed for the washing is brought from the separation of hydrogen sulphide containing 2.1 kmol $Na_2CO_3$/h and 0.8 kmol $NaHCO_3$/h. 1.85 kmol $Na_2SO_3$/h and 1.3 kmol $naHCO_3$/h are discharged from the washing stage.

Bicarbonate is produced by means of carbon dioxide of the flue gases in the carbonation stage according to the reaction $Na_2CO_3 + CO_2 + H_2O = 2\ NaHCO_3$.

15.6 kmol $Na_2CO_3$/h and 6 kmol $NaHC0_3$/h, which are discharged with the solution from the second separation stage of hydrogen sulphide, are led into the carbonation where they are treated by the 21500 m$^3$/h flue gas amount with the CO$_2$ concentration of 12.97%. By the absorption effeciency of 8.8% in the carbonation 11 kmol carbon dioxide/h is absorbed corresponding to bicarbonate, $2 \times 11$ kmol/h = 22 kmol/h whereby together 28 kmol bicarbonate/h and 4.6 kmol carbonate/h are led into the first and second separation stages of hydrogen sulphide.

The 5.5 ton/h steam amount needed for the separation of hydrogen sulphide is developed by expanding the circulation solution of the washing stage of the flue gases. The 689 m$^3$ circulation solution/h of the washing stage flows at the temperature of 67.5° C. into the expansion. The circulation solution is expanded into the pressure of the separation stage of hydrogen sulphide, corresponding to the temperature of 63° C. 5.5 ton steam/h , 63° C., is liberated in the expansion for the separation of hydrogen sulphide and 683.5 m$^3$/h at the temperature of 63° C. is returned into the washing stage. The flue gases are cooled by means of the warmed circulation solution of the washing stage from the dewpoint temperature of 70.5° C. into the temperature of 68.9° C.

In the heat recovery stage of the flue gases, which follows the washing stage, 795 m³ pure water/h is warmed indirectly by heat exchangers from the temperature of 30° C. into the temperature of 62° C. Warm water produced is rewarmed by conducting it into the cooling of the $SO_2$ gas obtained from the burning of the $H_2S$ gas whereat the $SO_2$ gases are cooled from the temperature of the dewpoint 82° C. into the temperature of 65° C. by reheating warm water into the temperature of 63.1° C. if the whole warm pure water amount produced is brought into additional heating and into the higher temperature when only a part of the pure warm water is brought thereto e.g. into the temperature of 68.7° C. when 133 m³/h is brought into reheating. 133 m³ cold water amount/h is preheated indirectly from the temperature of 5° C. into the temperature of 30° C. in the surface condenser of the $H_2S$ gas, in the circulation heat exchanger of the $H_2S$ vacuum pump and in the after-cooler of the $SO_2$ gas.

133 m³ preheated cold water/h, 30° C., is conducted either into the heat recovery stage of the flue gases after the washing stage as a part of pure water to be heated indirectly where it is heated to the temperature of 62° C. or preheated cold water is combined with the rest of cold water to be warmed, in which heat is recovered by cooling the flue gases further from the temperature of 40° C. to the temperature of 35° C. in the latter heat recovery stage of the flue gases whereby 170 m³ warm water/h produced directly is obtained at the temperature of 35° C.

What is claimed is:

1. A method for recovering chemicals from flue gases obtained from burning in pulp mills which use sodium as cooking base and from a water solution of the smelt i.e. green liquor, comprising: bringing the washed flue gases into contact with green liquor for the precarbonation of green liquor containing sodium sulphide into sodium bisulphide; bringing a solution containing sodium bisulphide from the precarbonation stage into contact with the solution or slurry containing sodium bicarbonate in order to react sodium bisulphide and sodium bicarbonate into sodium carbonate and hydrogen sulphide which is separated and recovered in a form of a gas; washing and cooling the flue gases obtained from the burning of waste liquor with a part of the sodium carbonate solution obtained from the separation stage of hydrogen sulphide, for the production of a discharge solution containing sodium sulphite; bringing the washed and cooled flue gases into contact with the second part of the sodium carbonate solution obtained from the separation stage of hydrogen sulphide for its carbonation to obtain the mentioned solution or slurry containing sodium bicarbonate; separating the hydrogen sulphide in at least two stages by partially separating the hydrogen sulphide at first in a first separation stage from a reaction mixture of the solution, which contains sodium bisulphide and flows from the precarbonation stage, and a part of the solution or the slurry, which contains sodium bicarbonate and flows from the carbonation stage, from which a part of the less hydrogen sulphide containing sodium carbonate solution so obtained is discharged while the rest is led into a second separation stage where it is together with the second part of the solution or the slurry, which contains sodium bicarbonate and flows from the carbonation stage, brought into countercurrent contact with a carrier gas or steam for the removing of the residual hydrogen sulphide from the reaction mixture and for producing said sodium carbonate solution, gases or steam containing hydrogen sulphide obtained from the second separation stage being fed into the first separation stage and after the countercurrent contact with the reaction mixture therein, withdrawn as recoverable gas.

2. The method according to claim 1, in which at least part of the solution obtained from the washing stage of the flue gases is submitted to expansion evaporation, the solution cooled in the expansion evaporation is returned into the washing and expansion steams are led into said second separation stage, whereas the operating pressure of the hydrogen sulphide separation stages is regulated so that the temperature of the expansion evaporation stage is lower than the dewpoint of the flue gas to be washed.

3. The method according to claim 1, in which the washed flue gases led into the precarbonation are wholly obtained from the carbonation stage.

4. The method according to claim 1, in which the gas containing hydrogen sulphide obtained from the first separation stage is burnt into sulphur dioxide gas which is cooled and led into the washing of the flue gases, for accomplishing the mentioned discharge solution containing sodium sulphite.

5. The method according to claim 4, in which hydrogen sulphide gas to be burnt and sulphur dioxide gas obtained from its burning are brought into an indirect heat exchange contact in order to raise the temperature of raw water used for the cooling of the flue gases.

6. The method according to claim 1, in which so much washed and cooled flue gases are fed into the carbonation stage that part of the solution or the slurry containing sodium bicarbonate which has to be fed from the carbonation stage into the second separation stage contains at least a double amount of sodium bicarbonate, compared to sodium bisulphide amount of the solution flowing from the first separation stage.

7. The method according to claim 1, in which green liquor to be fed into the precarbonation stage is cooled by bringing it into an indirect heat exchange contact with a sodium carbonate discharge solution liberated partly from hydrogen sulphide and discharging the first separation stage.

8. The method according to claim 2, in which the operating pressure of the hydrogen sulphide separation stages is regulated so that the operating temperature of the expansion evaporation stage is 5°–40° lower than the dewpoint of the flue gas to be washed.

9. The method according to claim 8, in which the operating temperature of the expansion evaporation stage is below 70° C.

* * * * *